Feb. 27, 1940.    H. L. SANDERSON    2,191,775
VIZOR
Filed Sept. 12, 1938
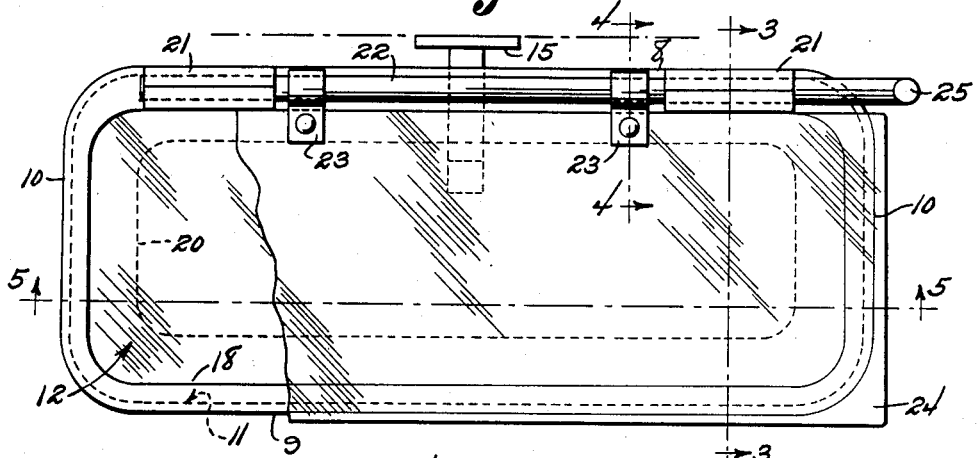
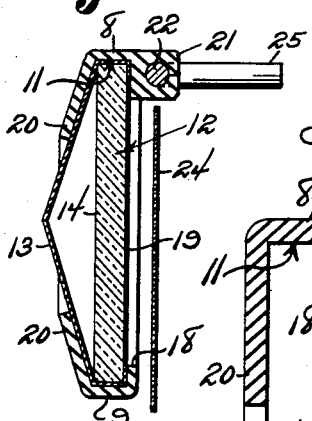
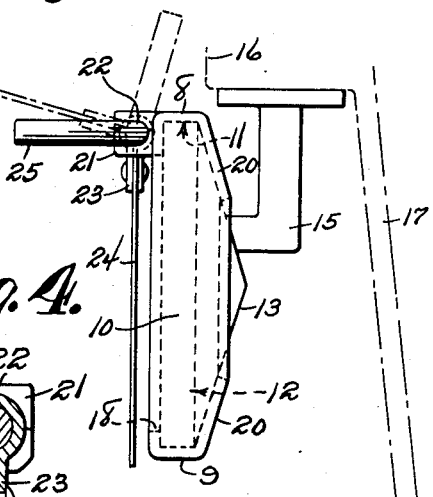
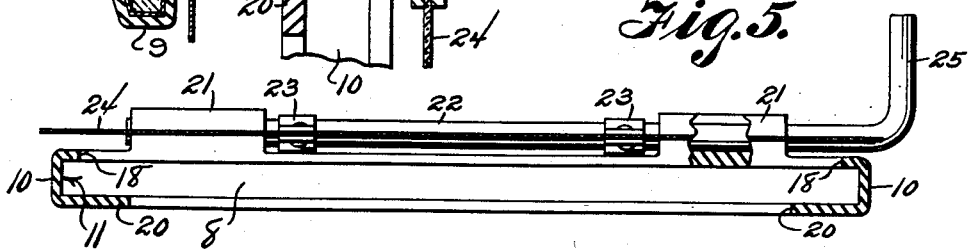
Harvey L. Sanderson, INVENTOR
BY Victor J. Evans & Co.
ATTORNEYS Patented Feb. 27, 1940

2,191,775

UNITED STATES PATENT OFFICE 2,191,775

VIZOR

Harvey L. Sanderson, Butler, Pa.

Application September 12, 1938, Serial No. 229,609

2 Claims. (Cl. 88—77)

My invention relates to rear view mirrors and more particularly to antiglare vizors therefor.

One of the principal objects of my invention is to provide an antiglare vizor for application to the rear vision mirror customarily used in motor vehicles for rearward observation, so that the glare attending the shining of headlights into the mirror may be eliminated.

Another object of my invention is to provide a device of the character described which may be selectively positioned in shielding or unshielding relation with respect to the mirror.

A further object of my invention is to provide a device of the character described which may be readily attached to rear view mirrors already in use without modifying the same.

An important object of my invention is to provide an antiglare vizor for rear view mirrors which is easy of attachment, simple in construction, durable in use, efficient in operation, and economical in manufacture.

Other objects and advantages will be apparent from the following description, appended claims and annexed drawing.

Referring to the drawing wherein like reference characters designate like parts throughout the several views:

Figure 1 is a front elevation of my invention illustrating the same as applied to a rear vision mirror of a motor vehicle.

Figure 2 is a side elevation thereof.

Figures 3, 4 and 5 are sectional views taken on the lines 3—3, 4—4 and 5—5 of Figure 1 respectively.

My novel rear vision mirror attachment or antiglare vizor comprises a semi-pliable frame of a substantially rectangular configuration in plan and which is fashioned with spaced parallel extending upper and lower sections 8 and 9 respectively. The upper and lower sections 8 and 9 are integrally connected together by a pair of spaced end sections 10. Each of the sections are formed, on their oppositely disposed faces, with elongated slots forming a continuous channel 11 extending about said frame and which accommodates therein the marginal edges of a rear vision mirror 12 of an ordinary construction having a backing 13 covering the rear face 14 thereof. Said backing has mounted thereon a bracket 15 securing said mirror to a desired portion 16 of a motor vehicle rearwardly and adjacent the windshield 17 thereof.

Each of the sections 8, 9 and 10 are provided with relatively narrow channeled walls or front lips 18 overlying the front face 19 of the mirror to define a relatively large vision area within said frame and with relatively wide channel walls or rear lips 20 overlying the backing 13 to effect a relatively large clamping surface about the marginal edges of the backing.

The frame is preferably constructed of semi-soft rubber whereby the sections coact with each other and said mirror to securely maintain said frame clamped to the mirror. The front lip 18 of the upper section 8 is provided with a pair of spaced bearings 21 through which is journaled a shaft 22 having fixed thereon a pair of spaced brackets 23 between said bearings 21 and secured to said brackets 23 is the upper end of a vizor or shield 24, of colored glass, Celluloid, pyroxyline, or other similar semi-transparent material. The shield 24 is of a rectangular configuration and adapted to overlie and cover the front face 18 of the mirror.

One end of the shaft 22 extends an appreciable distance beyond the adjacent bearing 21 thereof and is fashioned with an angularly disposed finger piece or operating arm 25, the latter serving to effect rotation of the shaft whereby the shield may be disposed in front of the mirror or upwardly above the same as desired.

It will also be noted that the bearings 21 being formed on the lip 18 of the upper section 8 are of a like material as said section and therefore yieldably maintain the shaft 22 in adjusted position whereby to preclude the shield 24 when in raised position from dropping in front of the mirror when not desired.

From the foregoing it will be apparent that I have provided a simple and efficient vizor attachment for rear vision mirrors and which may be readily attached to mirrors already in use without modifying the same.

It is to be understood that my device may be constructed in various sizes for attachment to mirrors of different sizes and that the same, while preferably constructed of rubber, may be constructed of other material without departing from the spirit of the invention or scope of the appended claims.

What I claim is:

1. Means for connecting an anti-glare shield to a mirror and comprising an endless strip of material defining a mirror accommodating opening and formed with a continuous mirror-margin receiving channel, said strip having an outer face integrally formed with bearings means extending therefrom adjacent said opening and disposed within the marginal confines of said face, said strip being of sufficient resiliency to effect self-adjustment of the strip about a mirror accommodated in said opening to maintain the margins of the latter clamped in said channel, said bearing means adapted to adjustably connect the shield to the strip to permit adjustment of the shield to covered and uncovered positions with respect to the mirror.

2. Means for detachably connecting an antiglare shield to a rear vision mirror and comprising an endless strip of material defining a mirror accommodating opening and fashioned with a pair of spaced oppositely disposed connected wall determining therebetween a continuous mirror-margin receiving channel and with one of said walls adapted to bound a mirror vision area, said last mentioned wall integrally formed adjacent said area with protuberant portions extending from and disposed within the marginal confines of its outer face, said strip being of sufficient resiliency to accommodate mirrors of varying sizes and configurations within said opening and to effect self-adjustment of the strip about an accommodated mirror to maintain the margins of the latter clamped in said channel by said walls, said portions formed with bearings, a shaft adapted for connection to said shield and rotatably adjustable in said bearings to permit adjustment of the shield to covered and uncovered positions with respect to the mirror.

HARVEY L. SANDERSON.